No. 794,832. PATENTED JULY 18, 1905.
C. T. ADAMS.
FOOTWEAR.
APPLICATION FILED JULY 14, 1900. RENEWED JAN. 19, 1905.
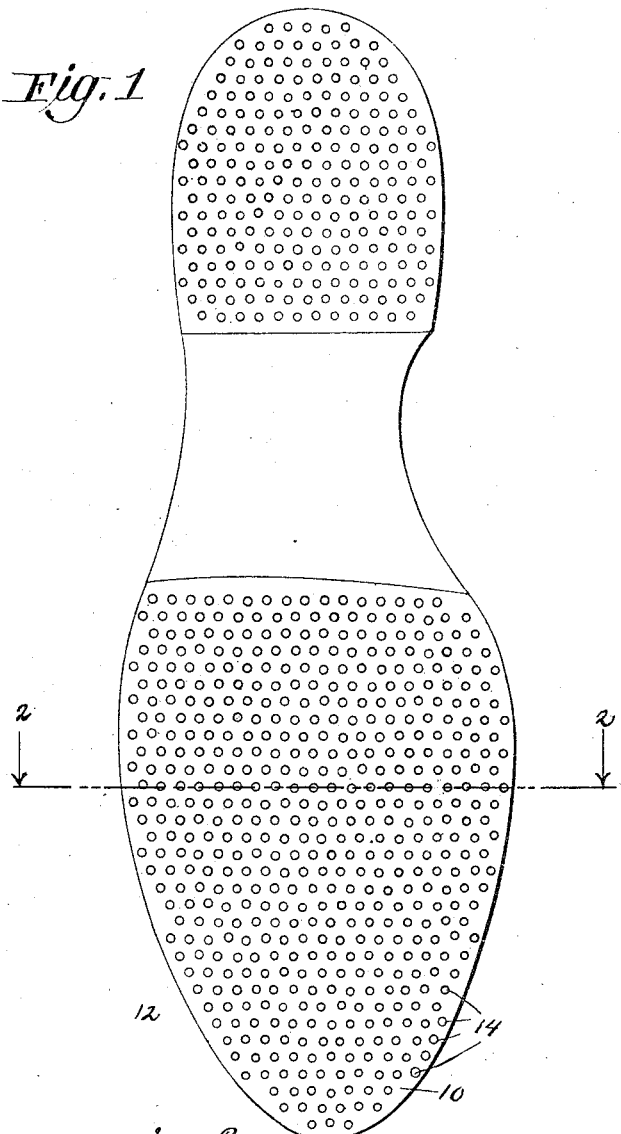
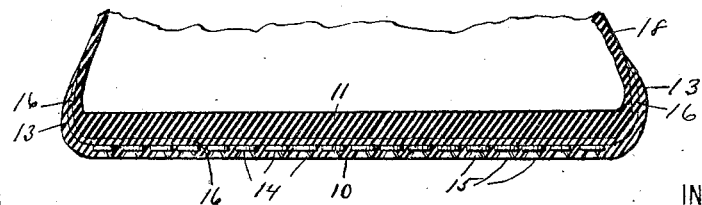

No. 794,832. Patented July 18, 1905.

UNITED STATES PATENT OFFICE.

CALVIN THAYER ADAMS, OF NEW YORK, N. Y.

FOOTWEAR.

SPECIFICATION forming part of Letters Patent No. 794,832, dated July 18, 1905.

Application filed July 14, 1900. Renewed January 19, 1905. Serial No. 241,783.

*To all whom it may concern:*

Be it known that I, CALVIN THAYER ADAMS, a citizen of the United States, residing at 12 West Thirty-third street, in the borough of Manhattan, city, county, and State of New York, have invented a new and useful Improvement in Footwear; and I do hereby declare that the following is a full, clear, and exact description of the same.

My invention relates generally to all kinds of footwear, but is particularly applicable to waterproof rubber boots and shoes, it having for its principal object to prevent slipping on wet or icy pavements, while at the same time preventing wear of the tread and prolonging the life of the boot or shoe.

My invention consists, practically, in a sole of a boot or shoe having a vulcanized fabric tread studded with headed rivets driven through the fabric tread and retained therein by the meshes of the fabric.

In order that my invention may be fully understood, I shall first describe in detail one mode of carrying the same into effect and then particularly claim the invention.

Reference is to be had to the accompanying drawings, forming part of this specification, in which the same parts are designated by like numerals in both the figures.

Figure 1 represents the tread of a rubber boot or shoe embodying my invention. Fig. 2 is a cross-sectional view of the same on the line 2 2, Fig. 1.

In the embodiment of my invention thus shown I take a piece of, by preference, vulcanized fabric 10, conforming generally to, but somewhat larger than, the rubber sole 11 of the rubber shoe 12, so as to leave a margin 13 on all sides. The tread portion of the fabric piece 10 I stud and fill with small headed metallic rivets 14, which are driven through the fabric from the inside by any suitable means or machine, and I then by preference, although not necessarily, clench or upset their outer ends by longitudinal pressure, so as to form small heads or enlargements 15 on and nearly flush with the tread-surface. The rivets are thus securely retained in position in the fabric by the inner heads of the rivets, the lateral pressure of the threads of the fabric on the shanks of the rivets, and also, if clenched on the outside, by the expanded or upset ends or heads thus formed. I then lay or cement over the inside of the piece thus equipped with rivets another similar piece 16, of plain fabric, and lay or cement the double-ply tread thus formed on the under side of the rubber sole 11, turning the margin of the double-ply tread up around the edges of the sole 11 and vamp 18, as shown in Fig. 2. The rubber sole, two-ply tread, and vamp are then pressed, vulcanized, and incorporated together in a suitable mold to complete the shoe. This shoe having its tread studded with rivets will effectually prevent slipping on wet or icy walks, as the hard ends of the rivets, being backed by the yielding rubber sole, will automatically adapt themselves to, find, and engage the surface of the pavement, while at the same time, owing to their being substantially flush with the rubber portion of the tread, they allow the latter to make ample contact with the pavement and do its share of the work. The rivets being retained by the meshes of the fabric and by the underlying fabric ply 16 against movement in any direction are not liable to be displaced, and owing to their close order they vastly improve the wearing qualities of the shoe and prevent the tread from being cut or torn by jagged projections on the pavement. It is also evident that the form of the metallic rivets is immaterial so long as they adapt themselves to secure confinement in the meshes of the tread fabric and exposure on the outer surface thereof, as described.

The rivets may be woven in the fabric in the process of weaving it instead of driven therethrough, as shown.

It will be obvious that the construction herein described may be applicable to any form of boot or shoe—as, for instance, for overshoes for horses to prevent slipping.

Having thus set forth the nature of my invention and the manner in which I carry the same into practice, I claim as new and desire to secure by Letters Patent—

A boot or shoe having an elastic sole and a two-ply woven-fabric tread attached thereto having a gang of metallic heads between the plies with shanks or projections extending through the outer ply.

In testimony whereof I have hereunto set my hand the 1st day of June, 1900.

CALVIN THAYER ADAMS.

In presence of—
DAVID G. RODE,
CLARENCE L. BURGER.